(12) United States Patent
Baurmann et al.

(10) Patent No.: US 8,151,215 B2
(45) Date of Patent: Apr. 3, 2012

(54) FAVORITE GUI FOR TV

(75) Inventors: Travis Charles Baurmann, San Diego, CA (US); Steven Friedlander, San Diego, CA (US); Tracy Ho, San Diego, CA (US); Yuko Nishikawa, La Jolla, CA (US); John Salisbury, Carlsbad, CA (US); Edgar Allan Tu, Poway, CA (US); Sabrina Tai-Chen Yeh, Laguna Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 959 days.

(21) Appl. No.: 12/027,358

(22) Filed: Feb. 7, 2008

(65) Prior Publication Data

US 2009/0204929 A1 Aug. 13, 2009

(51) Int. Cl.
*G06F 3/048* (2006.01)
(52) U.S. Cl. ........................................ 715/835; 715/836
(58) Field of Classification Search .................. 715/835, 715/201, 810, 836, 838, 860, 821, 824; 345/327; 348/E5.105
See application file for complete search history.

(56) References Cited

U.S. PATENT DOCUMENTS

| | | | |
|---|---|---|---|
| 6,072,483 A | | 6/2000 | Rosin et al. |
| 6,141,003 A * | | 10/2000 | Chor et al. ................ 715/719 |
| 6,795,972 B2 | | 9/2004 | Rovira |
| 6,856,332 B2 * | | 2/2005 | Kim ................ 715/810 |
| 6,859,937 B1 * | | 2/2005 | Narayan et al. ................ 725/37 |
| 7,117,440 B2 * | | 10/2006 | Gordon et al. ................ 715/721 |
| 7,240,289 B2 * | | 7/2007 | Naughton et al. ............ 715/740 |
| 2002/0062484 A1 * | | 5/2002 | De Lange et al. ............ 725/105 |
| 2003/0090524 A1 * | | 5/2003 | Segerberg et al. ............ 345/786 |
| 2004/0070620 A1 * | | 4/2004 | Fujisawa ................ 345/764 |
| 2004/0250278 A1 * | | 12/2004 | Imai et al. ................ 725/40 |
| 2005/0071782 A1 * | | 3/2005 | Barrett et al. ................ 715/838 |
| 2005/0149969 A1 | | 7/2005 | Kumar et al. |
| 2005/0235209 A1 * | | 10/2005 | Morita et al. ................ 715/716 |
| 2005/0240965 A1 * | | 10/2005 | Watson et al. ................ 725/45 |
| 2005/0257166 A1 * | | 11/2005 | Tu ................ 715/787 |
| 2006/0031889 A1 * | | 2/2006 | Bennett et al. ................ 725/80 |
| 2006/0212829 A1 * | | 9/2006 | Yahiro et al. ................ 715/810 |
| 2006/0218588 A1 * | | 9/2006 | Kelts ................ 725/39 |
| 2006/0253802 A1 * | | 11/2006 | Kim ................ 715/836 |
| 2007/0009229 A1 * | | 1/2007 | Liu ................ 386/83 |
| 2007/0107015 A1 | | 5/2007 | Kazama et al. |
| 2007/0186177 A1 * | | 8/2007 | Both et al. ................ 715/764 |
| 2007/0189737 A1 | | 8/2007 | Chaudhri et al. |

* cited by examiner

*Primary Examiner* — Doon Chow
*Assistant Examiner* — Wilson Varga
(74) *Attorney, Agent, or Firm* — John L. Rogitz

(57) ABSTRACT

A favorites GUI for a TV includes a carousel-type display of icons representing user-defined favorites that is overlaid on the current background video of the TV, with the center-most icon being the "current" icon and being enlarged relative to the other icons. Live video appears in icons representing TV channels. Other icons can represent, e.g., favorite photo/music files, favorite games from a game console, favorite content from an ambient player, etc.

3 Claims, 2 Drawing Sheets

FAVORITE GUI FOR TV

FIELD OF THE INVENTION

The present invention relates generally to graphical user interfaces (GUI) displaying user-defined favorite channels and the like for a TV.

BACKGROUND OF THE INVENTION

TVs increasingly grow sophisticated as centers of home entertainment systems. An outcome of this trend is that TVs increasingly can be used to present a wide variety of content from various content sources, TV channels being but one type of content source. As the robustness of TVs increases to present a large selection of content from various sources, the present invention recognizes that it is desirable to provide users with easy to use, intuitive management tools, among them the ability to establish subsets of content that are favored by the users. The present invention is directed to graphical user interface for this purpose.

SUMMARY OF THE INVENTION

A graphical user interface presents a new look and feel for a "favorites" list that is different from but can be used in conjunction with the present assignee's "cross-media bar" (XMB). The (GUI combines rich graphics with three dimensional (3D) elements, referred to herein as "icons" and also adds metadata such as channel logo, program description, etc. to icons that are associated with favorite TV channels. The GUI also presents program information about the next time slot for the channel associated with a currently focused icon. A user can quickly add to the list favorite channels, favorite inputs, favorite music or photos, and the GUI provides quick, direct access to the favorite content. When XMB is invoked, items can be added to the favorites list. Favorite TV channel icons display 3D video from their associated channels, and a history feature is provided showing recently-viewed channels and inputs.

Accordingly, a system includes a TV including a TV display and a processor associated with the TV for presenting on the TV display, in response to a command, a favorites graphics user interface (GUI). The GUI includes a revolvable display of icons representing user-established favorite content sources. The icons are arranged in one and only one horizontal row and are overlaid on a current TV image. A center-most icon on the display is enlarged relative to other icons on the display, and live video appears in icons representing respective TV channels. The live video is from the respective TV channel and is presented in three dimensional video.

An icon may represent a multimedia folder or file from a media player in the system, a computer game from a game console in the system, a video associated with a video disk player in the system, or other non-TV source. Also, a history list of recently viewed items can be presented in response to a user-generated signal, with the history list being juxtaposed with the icons.

A user can cause the GUI to revolve using an arrow key on a remote control device. Specifically, a user can cause the GUI to revolve using an arrow key on a remote control device until a desired icon is the center-most icon. The processor presents content from the source associated with the center-most icon in response to a user selection of the center-most icon. Moreover, the processor can automatically launch an application required to view content from the source associated with the center-most icon in response to a user selection of the center-most icon.

In another aspect, a TV system has a video display and a processor presenting a favorites graphical user interface (GUI) having three dimensional icons, with each icon being associated with a respective content source. At least one icon is established by live video from tie source associated with the icon. Metadata is presented with at least some of the icons, and the metadata can include a TV channel logo and a textual description of a program. The GUI also includes information on a program in a future time slot for a source associated with a currently focused icon. A user can manipulate a remote control to cause the icons to move across the video display until a desired icon is the currently focused icon, with the currently focused icon being selectable by a user to cause content from the source associated with the currently focused icon to be displayed on substantially the entire display.

In another aspect, a tangible computer readable medium embodies instructions executable by a processor for permitting a user of a TV to select favorites, causing icons associated with respective favorites to appear on a TV display in response to a user command, and causing the icons to revolve in response to a user command. The instructions can cause the TV to present a substantially full screen display of content from a source associated with a focused icon in response to a user command.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
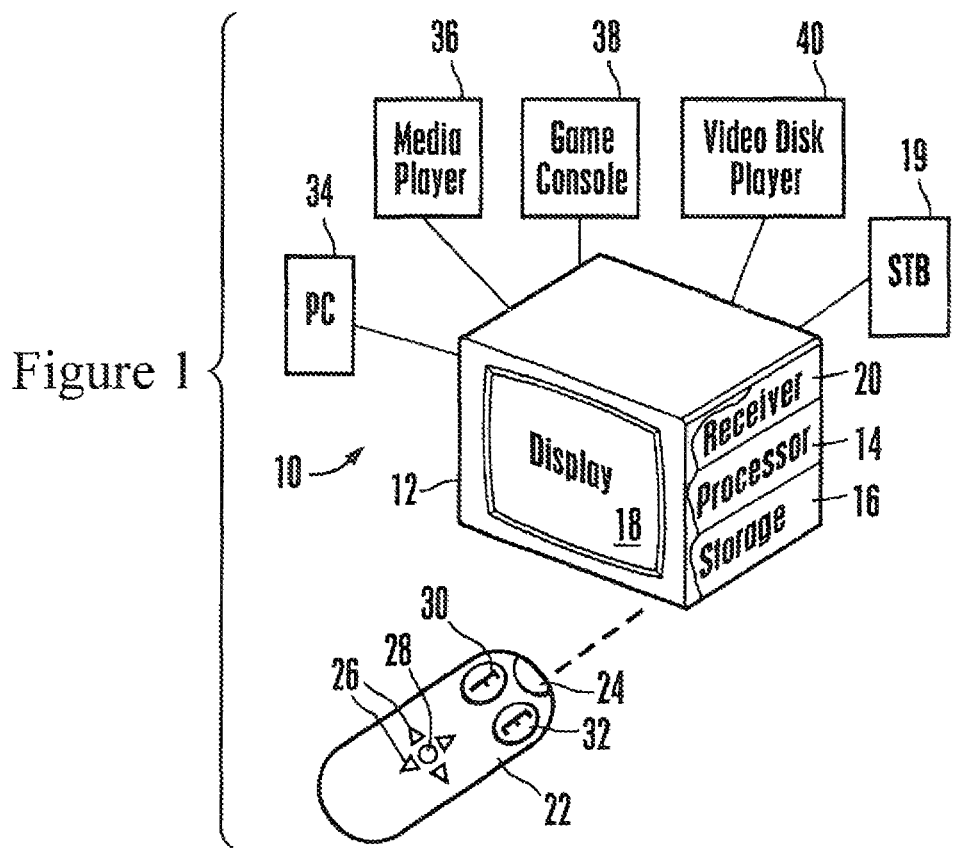
FIG. 1 is a schematic view of a non-limiting system in accordance with present principles, with portions of the TV chassis cut away for clarity.

Referring initially to FIG. 1, a system is shown, generally designated 10, that includes a TV 12 with TV processor 14 and tangible digital storage medium 16 that may be, without limitation, a magnetic or optical disk drive, a solid state device such as random access memory or read-only memory or flash memory, a removable stick medium or removable floppy disk, etc. The medium 16 and processor 14 may be stored in the TV housing as shown along with a display 18 such as but not limited to a high definition (HD) matrix display or a standard definition cathode ray tube display, or the processor 14 and/or medium 16 may be external to the TV housing, e.g., in a set-top box 19.

The TV 12 typically includes a wireless receiver such as but not limited to an IR receiver 20 for receiving wireless signals from a hand-held remote control 22 having a wireless transmitter such as but not limited to an IR transmitter 24. Up/down and left/right cursor direction keys 26 can be included on the remote control 22, as can be an enter key 28. Furthermore, a "favorites" key 30 can be provided on the remote control and labeled as such or bearing some other label but generating a signal when manipulated that is interpreted by the TV processor 14 as a command to show favorites in accordance with principles below. An "exit" key 32 can also be provided to exit the display of favorites icons as discussed below.

The TV 12 may communicate with one or more sources of content, including the STB 19, which is a source of TV channel content, as well as, e.g., a personal computer 34, a media player 36 that can store photos and music files and folders, a game console 38 that can store computer games for playing on the TV 12, and a video disk player 40 such as a Blu-Ray or DVD player for playing content from video disks on the TV 12. Personal video recorders (PVR) may also be included in the system.

Figure 2:
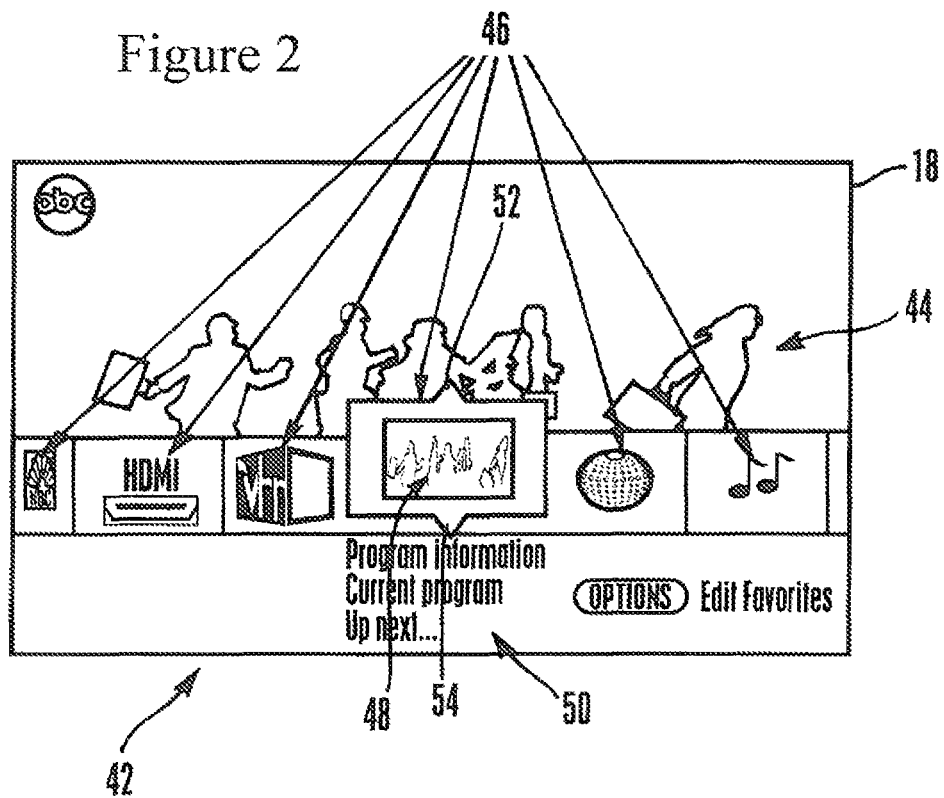
FIG. 2 shows a screen display presenting a favorites GUI in accordance with present principles.

FIG. 2 shows that a favorites GUT 42 can be superimposed on a current video presentation 44 when a user manipulates the favorite button 30 on the remote control 22. As shown, the GUI 42 includes one or more objects 46, also referred to herein as "icons", that are arranged preferably in the single row shown near the bottom of the display. Each object 46 is associated with a source of content. Some objects 46 are associated with respective TV channels that a user has designated as favorites in accordance with disclosure below. Other objects may be associated with photo and/or music files or folders from, e.g., the media player 36, while other objects may be associated with user-designated favorite videos from the disk player 40.

When an object is associated with a TV channel, a live video feed as indicated at 48 from that channel is displayed within the object, preferably in 3D. To this end, the processor 14 may execute a 3D application. In contrast, an object associated with a photo folder may be a thumbnail of a representative (e.g., first) photo in the folder. Objects for favorite programs from the disk player may be video from the associated programs or a still thumbnail.

As shown in FIG. 2, the center-most object 46 preferably is a currently focused icon in that it is enlarged relative to the other icons, and that, should the user manipulate, e.g., the enter key 28 on the remote, the processor 14 automatically causes the TV channel associated with the object to be tuned to and displayed in the current video presentation 44. Or, if the currently focused object 46 represents content such as photos or media files that require applications to view, upon receipt of the user selection command the processor 44 launches the application that is required to view content from the source associated with the focused object or icon 46 to cause the content to be displayed on the TV.

When the user manipulates the left or right arrows on the remote, the GUI 42 revolves left or right across the display, moving a new icon into the center-most (focused) spot and enlarging it relative to the other icons, with the former focused icon being moved away from the center spot and reduced in size. Furthermore, when metadata is known for the source of content (as it can be using, e.g., Gemstar), the metadata can be presented with the associated icon. As indicated at 50 the metadata can include a TV channel logo and a textual description of a program. The metadata may be presented for each visible icon or it may be presented only for the focused icon. The GUI can also include information on a program in a future time slot for a source associated with the currently focused icon.

Additionally, a list of recently viewed items is presentable in response to a user-generated signal, and the history list can be juxtaposed with the icons. In one implementation the history list may contain, e.g., the last ten things (TV channels, disk programs, photo albums) viewed, or it can contain only the last, e.g., ten TV channels viewed. In any case, the list may be navigated by manipulating the remote control to position a screen cursor over one of the up and down arrows 52, 54 that can be presented on the focused (history) icon 46 and hovering the cursor over the arrow 52, 54 and/or selecting a key such as the "enter" key 28 when the cursor is positioned over the arrow 52, 54. Invoking the list from the up arrow 52 may result in the oldest entry or entries of the list to be presented, while invoking the list from the down arrow 54 may result in the newest entry or entries of the list to be presented.

Figure 3:
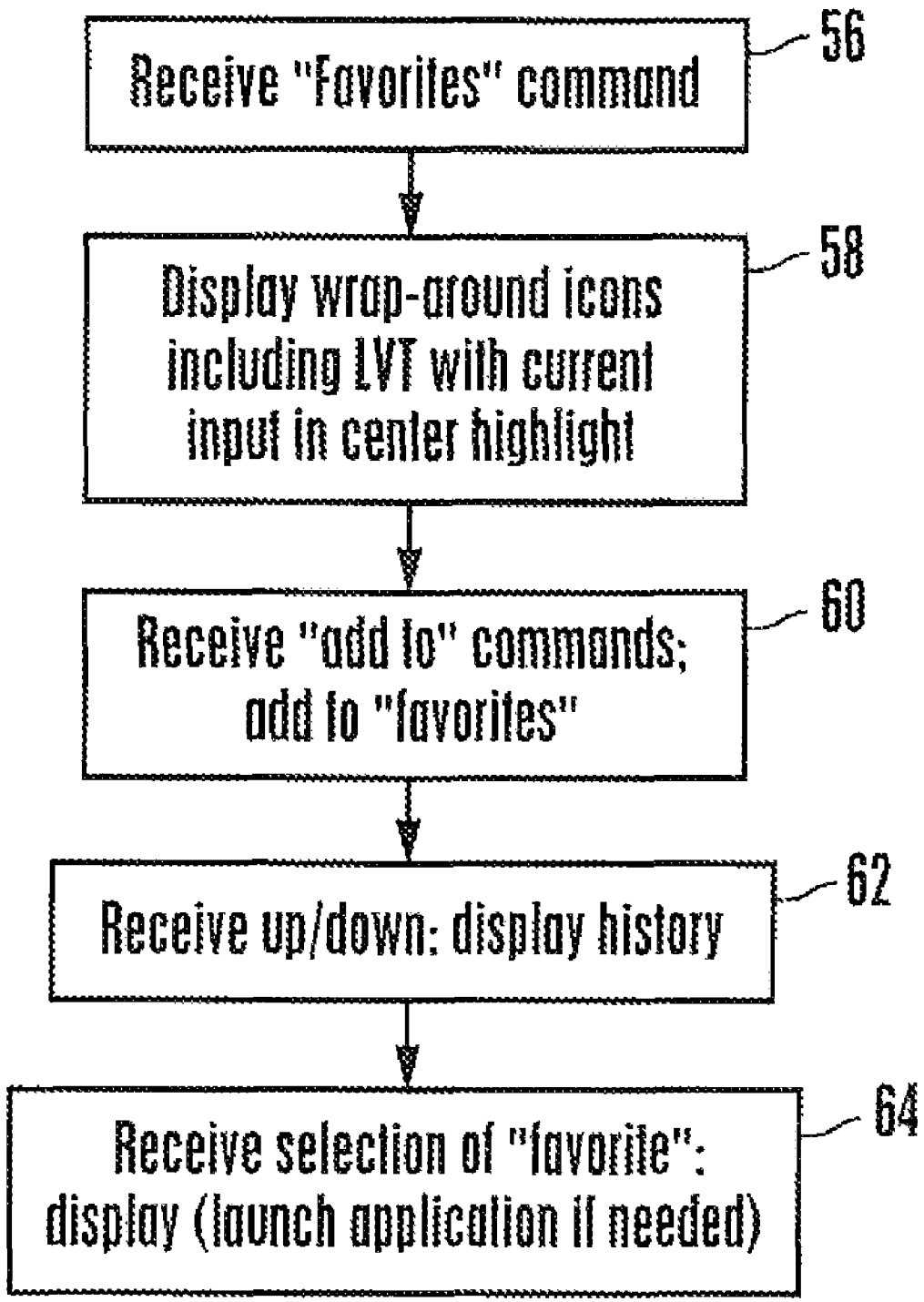
FIG. 3 is a flow chart of non-limiting logic in accordance with present principles.

FIG. 3 shows various general logic steps that may be executed in accordance with disclosure above. Non-limiting details of example implementations are given below.

At block 56 a command from the remote control can be received by the TV processor 14 to display the favorites carousel shown in FIG. 2. The objects or icons 46 are displayed in response at block 58 preferably in a wrap-around (i.e., virtual endless) format. The focused icon at invocation can be associated with the currently displayed content, so that, for example, if a TV channel is being displayed when the command is received to display favorites, the object or icon 46 that is initially the largest, center-most icon in the display is associated with the currently tuned channel and, thus, presents a smaller window of the same live video from the TV channel that substantially fills the remainder of the TV screen.

Block 60 indicates that commands may be received from, e.g., the remote control to add content to the favorites. As an example, when the favorites icons are being displayed, a screen button can be presented that can be selected to cause the currently displayed content to be added to the favorites.

Block 62 indicates that the above-discussed history list can be displayed over the favorites icons by manipulating the up/down elements 52, 54 as described. At block 64, a user may elect to display content associated with, e.g., the focused icon by inputting a command such as a "select" command using the remote control. In the event that content, e.g., a photo folder, associated with the selected icon requires an application to view, the TV processor 14 automatically launches the application. Likewise, if content from the disk player 40 is associated with the selected icon, the disk player is powered up to play the selected content.

The following discussion is related to non-limiting specific implementations. The favorites feature ("Favorites") discussed above, including presenting the objects or icons 46, can be invoked from the remote control 22 by pressing the favorites key 30. If there is on-screen display (OSD) text on the screen (e.g., a banner) when <Favorites> is pressed, the OSD can be removed and the favorites icons 46 displayed.

The states in which Favorites is available may include the following. Favorites can be accessed at any time by pressing the <FAVORITES> key 30, except for interrupting certain other applications (such as Initial Setup, Auto Program, Digital Channel Add, etc.) as may be specified by other specifications. Also, Favorites can be allowed in External Input mode, including PC input mode. Pressing <Favorites> will launch the Favorites on top of the external input using OSD overlaid on top of live video. In XMB Photo/Music Viewer and Ambient Player modes, pressing <FAVORITES> will exit from Photo/Music Viewer or Ambient Player, and display Favorites icons 46 overlaid on a wallpaper background.

On the other hands if the system is in a multi-picture mode (PIP/PAP) and the <FAVORITES> key 30 is pressed, the TV exits from PIP/PAP and returns to single picture mode to display the Favorites application.

Favorites interaction with other OSD: if other OSD is displayed, existing rules defined in the remote control key response are employed. For example:

Muting (do not remove Muting, but display Favorites OSD with Muting still visible on top of Favorites closed caption (CC): No simultaneous display for CC text and Favorites. Allow users to press <CC> to toggle it on/off/on when muted, but suppress CC text from displaying. When user exits Favorites, and if CC was toggled On, display CC text.

Blocked Channel/Program OSD: Display Favorites Viewing Screen overlaid on top of the blocked message.

With respect to Favorite content objects, from the Favorites viewing screen, there are main single content objects that display persistently, and other single content objects that users can add to the entry screen when they specify favorite items. Selecting any single object will play, tune, or change input to that object. For instance, selecting a Favorite Channel object 46 will tune to that channel. Selecting a Favorite Photo folder object 46 will play the associated photo slideshow. The only object that contains a list is History which displays a list of last tuned channels or inputs. Otherwise, all other content represents a single piece of content (e.g. if a folder of music or photos is added as a Favorite, it is considered a single piece of content and will be represented as such).

A background video can be used within the History list object, and it is represented in one of two ways:

Live video texture (LVT) thumbnail: Live video texture of the background video source will display on Favorites Viewer Screen (if source is RF or composite). If the background source is HDMI, component, PC input then an icon of the input will display. The cursor can highlight the History list object, but not the specific LVT thumbnail.

Icon representing the input: An icon is used for Component, HDMI, and PC inputs, which cannot be rendered in LVT.

The content of the icons 46 may be:

Favorite Channels: Displays channel icons that have been added to Favorites by the user.

Favorite Inputs: Displays input icons that have been added to Favorites by the user.

History: Displays the last 10 tuned channels or inputs. This is the only list object within content carousel. Default item is most recently tuned channel/input which will display as LVT or icon. This displays persistently in content carousel.

Ambient Player: Displays animation examples of Ambient Player themes that have been added to Favorites by the user. (These examples are fixed animations defined for each pre-set theme, and do not change). By default, all ambient viewers are marked as Favorites.

Favorite Photos: Displays favorite photo content that has been added to Favorites by the user (e.g., USB or DLNA photos). By default, built-in photo contents are added to favorites.

Favorite Music: Displays favorite music content that has been added to Favorites by the user. (e.g., USB music). By default, built-in music contents can be added to favorites.

User can create custom slideshows and playlists.

If desired, an overall limit can be established of (minimum) 30 number of objects that can be added as Favorite items to Favorites. There can be a maximum number of items per category. The screen will scroll left/right to access additional content if it is available.

A single object can either be one Favorite channel/input/photo/music/ambient theme or one Photo or one music folder (which could contain many individual photos).

General Defaults and Interactions:

Default Focus

1. Entry animation: Upon entering Favorites application, there will be an animation that occurs when the content appears. The entry effect interval may be if the user presses <Favorites> at first time after Power On (per TV session).
2. Upon entering the Favorites application, the focus is dependent on whether the user had a last-accessed item within the application. If there is no last-accessed item (i.e. just bought TV, first time Power On, content was removed), focus is on the History list—specifically the element representing the current background TV state (LVT thumbnail for RF/Composite, or icon for non-RF/Composite).
3. If there is a last-accessed state, focus is on last-accessed content object.
4. The "last-accessed state" is remembered across power on/off.
5. The background video should remain in the same state when entering Favorites from channel or input. However, when user returns to Favorites from Photo/Music viewer/Ambient player, a wallpaper background may display.

Navigation: Viewer Screen

Fixed focus is used during navigation such that the focused content object moves into view as the highlightable item.

Horizontal navigation using <CURSOR LEFT/RIGHT> is designated for scrolling left and right among content objects.

Vertical navigation using <CURSOR UP/DOWN> is designated for scrolling up and down within History list only.

Pressing <SELECT> on any item will exit from the favorites screen as follows:

If item is a channel or input: display the channel or input full screen (if TV was already tuned to the selected channel or input, then re-tuning is not necessary).

If item is an ambient player: launch the selected Ambient player according to the Ambient Player UI Specification rules.

If item is a photo or music file or folder: launch the associated player.

6. Up to N (e.g., five) icons 46 are displayed on a single screen (content carousel) and the screen will show portions of other content at edges of screen if there is additional content.
7. The screen will scroll left/right to access additional content if it is available.
8. The content carousel does wrap.
9. Favorite objects 46 may be displayed in sub-groups in the following order from left to right: Ambient Player, Photo, Music, History+LVT, Channels, Input (approximately same order as XMB). Depending on the TV model, fewer items may display when user first accesses New Favorites. For instance, one model might display History+LVT and the two Ambient Player templates while another model might display one preloaded content thumbnail (each) for Music file/folder object and Photo file/folder object, History+LVT, and two Ambient Player templates. Since the number of items to display is limited to N whole content items, not all content will display in same view.
10. Displayed content items can show "live previews" of their contents. The previews are either animated icons (i.e. preloaded animation examples of Ambient Player themes) or small thumbnails of the content objects (that fade in/out when showing more than one thumbnail.

11. As the user navigates among content, a visual treatment to different types of content call be effected. For instance, the background color may change as the user scrolls from Favorite channels to music to photos, etc.
12. During navigation of content, an animation effect may be established that allows the user to scroll/jump among content groups when pressing and holding down <Cursor Left/Right> key.

Add/Remove Favorites

From XMB, Favorites or Full screen: Adding and removing Favorites is done via an <Options> menu, XMB, Favorites, or full screen. Add/remove function is available depending on which application/feature the user is in. Users can select t"Add to Favorites" from XMB, full screen, or Favorites (only History list: channels/inputs). When in XMB, users can Add to/Remove from Favorites any item from TV channel list (channel), External Inputs (inputs), Music or Photo categories (files or folders). Users can select "Remove from Favorites" from XMB, Favorites (via Options menu), or full screen.

When items are added to Favorites (via Options menu) from full screen:

TV: Add current channel to Favorites
External inputs: Add current input to Favorites
Photo (Full screen): Add one photo/file to Favorites
Photo (Slideshow): Add album/folder to Favorites
Music (Visualizer): Add one file or folder to Favorites
Ambient Player (full screen): Add current ambient player theme to Favorites When an item is added to Favorites, it will display within proximity to its related content group (i.e. single channel objects are grouped together, single photo file/folder objects grouped together, etc). The icons may be sorted numerically/alphabetically. For instance, when more than one Ambient Player theme is added to Favorites, they are sorted alphabetically. When Favorite channels are added to Favorites, they are sorted numerically.

A clip message may be displayed advising that "Channel X/Input X/File or folder name" has been added to Favorites.

The cursor focus then moves to the newly added Favorite item. Content carousel will animate to new Favorite item's location within carousel.

When a channel is in full screen, the option to Add to Favorites maybe available only for valid channels in the channel map. If the currently tuned channel is not in the map, then "Add to Favorites" is not shown in Options menu.

When an item is removed from Favorites, a clip message may appear that advises "Channel X/Input X/File or folder name" has been removed from Favorites, The cursor focus then moves to the next item located to the left of the removed contents. If there is nothing to the left, then focus moves to the next item to the right.

If the user selects initial Setup option from XMB, this can clear Favorite channels but will not affect other Favorite content (e.g. Input, Music, Photo, Ambient Player). The Favorites contents may also be removed by category such that the user can select to clear whole groups of content from Favorites. When the user is focused on a Favorite item, the user can press <Options> for Options menu and either select to remove the focused content (e.g. "Remove from Favorites") or select to clear all Favorite content from that category. This latter option may be available from the Options menu setting, "Clear Favorite [Channels/Inputs/Music/Photos]" which will prompt the user for a confirmation prior to cleaning the Favorite contents. The "Clear Favorite [Channels/Inputs/Music/Photos]" option may be made available only within Favorites application (i.e. not from XMB or full screen) and when there is Favorite content for that category within Favorites.

Regarding Favorite channels, this will remove only the Favorite channels in the current tuning mode (cable or antenna) based on the user's current menu setting. This "clear" option is not offered when the user is focused on History list or any Ambient Player object, since these categories don't involve customization.

When the user is in Favorites, metadata will display below the focused content object 46 as mentioned above. When the user navigates among Favorite content, the metadata will refresh to show information for the focused content. The metadata area will remain a static size. Auto-scroll behavior can be implemented if there is more information than is available to fit in the designated size. If auto-scrolling is not feasible available metadata can be displayed and any information that cannot fit truncated. Ellipsis can be used to indicate information has been truncated.

If the user enters Favorites from channel or input, the Small Channel Banner can display. The Small Channel Banner identifies the channel or input currently tuned in the background video. If the background video is an external input, only the Input label, Input name and icon are displayed in the upper-right corner. This should display persistently on currently tuned background video.

If available, the following metadata should display for a Favorite channel object within the content thumbnail.

Channel logo (if not available, a dummy logo) is displayed within the content object 46.
Channel number
Channel/Station name, and if the station name is not available PSIP/XDS or a user label, or nothing, can be shown.
Program Title (if not available, leave blank)
If the channel is blocked, "Channel Blocked" is shown in the program title area, and in the program description area, "Program blocked" is shown.
If the program is blocked, "Program Blocked" is shown in the program title area, and in the program description area, "Program blocked" is also shown.

Additionally, if available, the following metadata can be displayed below the focused Favorite channel object 46:

Current program description
Progress bar showing start/end times, and current elapsed time (in form of a progress bar, with current time as the progress marker)
"Up next" header within the banner relating to the program in the upcoming time slot
Program title and program information for program in next time slot If available, the following metadata can be displayed within a Favorite object 46:

Input logo
Input label or name

Focused—If available, the following metadata should display below focused Favorite input object:

Program title (if available; if not available, leave area blank)

Depending on the type of content (channel or input) that is focused in the History list object, display the same metadata information as specified above.

If available, the following metadata can be displayed within a Favorite music object 46: * Album art. Also, the following metadata can be displayed below a focused Favorite music object 46:

Album art
If focused content is a file, the Music title or file name can be displayed If focused content is a folder, folder name is displayed.

If available, the following metadata can be displayed within a Favorite photo object 46: * If non-focused content is a file, display single photo thumbnail If non-focused content is a folder, cycle through photo thumbnail contents Focused—If available, the following metadata should display below focused Favorite photo:

If focused content is a file, display Music title or file name.

If focused content is a folder, display folder name.

If available, the following metadata should be displayed within a Favorite Ambient player object 46:

"Preview"animated icon of ambient player theme

Focused—If available, the following metadata should display below a focused Favorite Ambient player object 46: Name of Ambient Player The Favorites menu can be exited in the following ways:

Pressing <Select> on any Favorite content object (channel, input, music, photo, ambient background use).

Pressing <HOME> on the remote control 22 (exits back to previous TV state, RE/Video input). If the user was in Photo or Music application, pressing <HOME> would put cursor on Photo or Music category.

Pressing the <RETURN> key on the remote control from within Favorites

Pressing <FAVORITES> on the remote control

Pressing <ENT> for blocked channel, if background video is blocked.

Timeout

The Options menu mentioned above can display context-dependent menu options when in Favorites, In addition to the above features, as the user navigates through the Favorites channels, the background video can either tune or stay on the current channel, based on the user's menu setting.

The Favorite channels will show channels only for the current tuning mode, antenna or cable (based on the user's menu setting in the Channel menu). There need be no indication on the Favorite channels objects as to the current tuning mode.

As discussed above, the history feature automatically stores recently-viewed channels and inputs, in effect being an automatic or dynamic "Favorites" list that the user does not need to manually program. The History list can contains the following elements:

LVT/Icon: if background video source is RF/Composite, then LVT displays last-tuned channel. If background source is Component, HDMI, and PC inputs, they cannot be rendered in LVT. Instead, an icon of that input will display.

Small Channel Banner identifying the channel currently tuned in the background video. If the background video is an external input, only display Input label, Input name and icon in upper-right corner. This may display persistently on currently tuned background video, Vertical navigation using <CURSOR UP/DOWN> is designated for scrolling up and down among channels or inputs within History list only.

The history object 46 may be displayed with the cursor focus on the currently tuned item as the first item of the list and displayed as LVT or input icon. This currently tuned item can also be the background video source. If the user is in external input mode, the same behavior as in Favorites will occur (OSD is overlaid on top of external input mode, with cursor on topmost item in the list, and tuning behavior dependent on user's menu setting). Only one channel or input is displayed at a time within History list (but the user can scroll up/down to view more channels/inputs). Graphical elements (e.g., arrows 52/54) can be used to indicate when there is more than one channel/input in History list so that users understand they can scroll up/down. If there is only one item in History (e.g., first time), no graphical elements need be displayed and the history object will not be scrollable. The history can wrap, with most recent at the top of the list. Preferably, the History list displays only the channels for the current tuning mode (Cable or Antenna). If the user changes tuning modes, the history list can be cleared.

The default item to show in History should be last tuned channel or input (shown as LVT if possible). The currently tuned channel upon entry into the History list will automatically be stored as the latest history channel. If user is scrolling <up/down> within History list, then moves <left/right>, then returns to History list, focus should remember the last active item the user had left cursor on. The background video always can be the last tuned channel/input in History. If the last tuned channel/input is a Favorite content item that also exists in History, default entry focus is on History list. As the user navigates through the History list, the background video can either tune or stay on the current channel, based on the user is menu setting.

While the particular FAVORITES GUI FOR TV is herein shown and described in detail, it is to be understood that the subject matter which is encompassed by the present invention is limited only by the claims.

What is claimed is:

1. A non-transitory computer readable medium embodying instructions executable by a processor for:

permitting a user of a TV to select favorites;

causing icons associated with respective favorites to appear on a TV display in a content carousel in response to a user command;

causing the icons to revolve in the content carousel in response to a user command; and causing the TV to present a substantially full screen display of content from a source associated with a focused icon within the content carousel in response to a user command, wherein live video from a video source currently serving as video input to the TV is presented on a favorites viewer screen of the content carousel responsive to a determination that the video source is a radiofrequency (RF) source or a composite source, and responsive to a determination that the video source is a high definition multimedia interface (HDMI) source, an icon of the HDMI source is presented on the display of the content carousel.

2. The medium of claim 1, wherein icons associated with TV channels include live three dimensional video feeds from the respective channels, the instructions including superimposing icons on a current video being displayed, the instructions including presenting icons in a single row of icons in the content carousel.

3. The medium of claim 1, wherein the instructions include presenting a history list of recently viewed items in response to a user-generated signal, the history list being juxtaposed with the icons in the content carousel.

* * * * *